United States Patent [19]

Wise et al.

[11] 3,931,079

[45] Jan. 6, 1976

[54] VISCOSITY STABILIZED WAX EMULSION POLISH COMPOSITION

[75] Inventors: Louis M. Wise, Berkeley Heights; Andrew M. Murdoch, Paramus; Leon E. Paszek, Mountainside, all of N.J.

[73] Assignee: American Home Products Corporation, New York, N.Y.

[22] Filed: Sept. 15, 1971

[21] Appl. No.: 180,906

[52] U.S. Cl. ..................... 260/28.5; 106/8; 106/10; 260/29.6 H
[51] Int. Cl.² .......................................... C09G 1/10
[58] Field of Search ..................... 106/3–10; 260/28.5, 29.6 H, 86.1 R

[56] References Cited
UNITED STATES PATENTS

| | | | |
|---|---|---|---|
| 2,798,053 | 7/1957 | Brown | 260/41 |
| 2,909,462 | 10/1959 | Warfield | 424/81 |
| 2,923,692 | 2/1960 | Ackerman | 260/29.6 H |
| 2,955,047 | 10/1960 | Terry | 106/3 |
| 3,013,907 | 12/1961 | Baird | 106/14 |
| 3,429,842 | 2/1969 | Wolstoncroft | 260/28.5 R |
| 3,553,123 | 1/1971 | Behnke | 260/28.5 R |

OTHER PUBLICATIONS

Chem. Abst. 55: 1038 b.

*Primary Examiner*—Theodore Morris
*Attorney, Agent, or Firm*—Stephen Venetianer

[57] ABSTRACT

Multicomponent wax emulsion polish compositions are viscosity stabilized with a compound of the formula $R-X-O-(C_2H_4O)_n-H$ wherein R is an aliphatic group and X is selected from the group consisting of phenylene, carbonyl and a carbon to oxygen bond and n is a whole number from about 12 to about 50. The compositions are of special interest in providing shoe polish compositions useful in functional dispensers.

7 Claims, No Drawings

VISCOSITY STABILIZED WAX EMULSION POLISH COMPOSITION

This invention relates to new and novel multicomponent wax emulsion polish compositions which are stabilized against adverse viscosity changes. More particularly, this invention relates to new and novel footwear polish compositions which have been stabilized against adverse changes in viscosity permitting their use in functional applicators.

BACKGROUND OF THE INVENTION

The use of polishing compositions containing waxes to protect and beautify substances such as leather, wood and metals has long been known. At one time, the application of a waxed finish by hand required the expenditure of much physical effort to apply the wax composition, followed by additional physical effort in buffing the composition to the required degree of gloss. When the wax composition was colored with a dye material, as in shoe polish, an almost certain degree of staining the hands and clothing of the person applying the polish composition came to be expected. With the advent of the modern technological age, efforts have been directed to solving these age old problems of reducing the effort and messiness resulting from the application of polish compositions.

One direction these efforts took was to soften the wax composition used. This has been accomplished by the use of emulsions of waxes and softening ingredients. See U.S. Pat. No. 3,231,397 for this type of composition. These softer paste waxes were easier to apply than the previously used hard waxes and, if the compositions were carefully formulated, they could be buffed to the desired degree of gloss with a minimal amount of effort. However, these soft waxes still retain one great drawback. They are unpleasant to use in that a risk of staining the hands or clothing is always present and the pasty nature of the compositions lends itself to uneven use and application.

In efforts to solve the above-described messiness problem, other efforts have been taken. With the advent of the pressurized aerosol can, efforts have been directed to produce aerosolized polish compositions that required no buffing. In general, these aerosol compositions are based on a formulation of a relatively low wax concentration dissolved in a solvent system. See U.S. Pat. No. 3,328,179 for this type of composition. Although easy to use, several drawbacks to aerosol polish compositions are evident. The solvent nature of the polish composition, although requiring no buffing, evidences a glass-like appearance which is unacceptable to the consumer, especially for leather polishes. Also the aerosols are unwieldy to use in that exact spray patterns are hard to predict and messiness easily results. When using dye containing leather polishes, this can lead to staining of the area surrounding the field of use.

Attempts to overcome these shortcomings have developed on devising a neat, easy to apply composition which may be provided with a buffed finish with a minimal amount of effort. One method was to supply the familiar dauber-in-a-bottle dispenser. This has proven unacceptable to the consumer in that both hands are required to properly effectuate its use and the more acceptable looking buffable compositions, emulsions in nature, tended to become viscous or separate in the bottle. This has forced the use of solvent compositions which provide the unacceptable glassy finish. It has become evident that the composition most desirable under present conditions would use a functional applicator with a wax emulsion type formulation. By a functional applicator is meant one that is usable with one hand and provides means for dispensing as well as spreading the polish composition. For example, this may be in the form of a flexible, rigid or pressurized container with the orifice from which the polish composition exists covered by a spreading means, such as felt or sponge applicator.

It would be expected that the wax emulsion type compositions, which require a light, almost effortless, buffing to provide the more acceptable buffed finish, would be utilized. However, this has not been the case. The more desirable wax emulsion type polish compositions tend to change viscosity and become thick or watery upon the passage of time, and, therefore, are not useable in a functional type container. This increase in viscosity also leads to compositions which tend to become more and more uneven in application and require increasing amounts of effort to provide the required buffed finish.

It is, therefore, an object of this invention to provide wax emulsion polish compositions which are stabilized against adverse changes in viscosity and are, therefore, particularly useful in functional type polish applicators. Other objects will appear more fully hereinafter.

It has surprisingly been found that a multicomponent wax emulsion type composition is stabilized against adverse changes in viscosity by the inclusion in the composition of from about 0.1% to about 1.0%, by weight, of a stabilizer selected from the group consisting of compounds having the formula $$R-X-O-(C_2H_4O)_n-H$$

wherein R is an aliphatic group (fatty acid residue) containing from about 9 to about 18 carbon atoms, X is selected from the group consisting of phenylene, carbonyl and a carbon to oxygen bond and $n$ is a whole number from about 12 to about 50. The most efficacious activity has been discovered to exist when the viscosity stabilizer is present, by weight, from about 0.4% to about 0.8% of the final composition.

In particular, substances which are useful as viscosity stabilizers are exemplified by substances such as Igepal CO 630, a trademark of General Aniline and Film Corporation for a condensation product of nonylphenol with nine moles of ethylene oxide, Arosurf HFS-846, a trademark of Archer Daniels Midland Co. for a condensation product of stearic acid with 40 moles of ethylene oxide, Arosurf HFS-849, a trademark of Archer Daniels Midland Co. for a condensation product of stearic acid with 50 moles of ethylene oxide, Ethosperse LA-12, a trademark of Glyco Chemicals, Inc. for a condensation product of lauryl alcohol with 12 moles of ethylene oxide and Lipal 20-OA, a trademark of Drew Chemical Corporation for a condensation product of oleyl alcohol with 20 moles of ethylene oxide.

When the wax emulsion is a shoe polish composition, a typical range, by weight, of ingredients would be:

| | |
|---|---|
| Wax | from about 1.0% to about 10.0% |
| Silicones | from about 0.0% to about 1.0% |
| Emulsifier | from about 0.5% to about 2.0% |
| Morpholine | from about 0.5% to about 3.0% |
| Viscosity regulator | from about 0.1% to about 1.0% |
| Triethanolamine | from about 0.1% to about 1.0% |
| Dye | from about 0.0% to about 5.0% |
| Stabilizer | from about 0.1% to about 1.0% |
| Water | from about 20.0% to about 95.0% |

In the above formulation, the waxes are exemplified by the commonly used waxes such as microcrystalline waxes, montanic acid ester waxes, montan wax, Fisher-Tropsch waxes, ozokerite waxes, polyethylene waxes and natural waxes such as beeswax, oricury, candelilla and bayberry and the mixtures of waxes. The silicones are preferably of the dimethylpolysiloxane type of the general formula:

$$(CH_3)_3Si\text{---}O\text{---}[(CH_3)_2Si\text{---}O\text{---}]_x\text{---}Si(CH_3)_3$$

where the viscosity of the silicone increases with increasing value of $x$. The silicones are added to enhance the buffability of the dried polish film. Particularly of use in this application are silicones with a viscosity in the range of about 200–500 centistokes at 25°C. The emulsifiers are used to produce the wax emulsion and are exemplified by the alkali (Na, Li, K) and amine salts of high molecular weight fatty acids, ($C_{10}$–$C_{22}$) such as oleic, stearic, palmitic, myristic and the like. The morpholine is included with the fatty acids in the composition to form and stabilize an emulsion system. The viscosity regulators are added to adjust the viscosity of the emulsion to the desired degree. Exemplary of these viscosity regulators are carboxyvinyl polymers. The carboxy vinyl polymer is substantially insoluble in water and is the acid form of a polymer prepared as described in U.S. Pat. No. 2,798,053, granted July 2, 1957, selectively utilizing from about 0.75 to 2 percent by weight of polyalkenyl polyether, for example, polyallyl sucrose as the crosslinking material, the remainder being essentially acrylic acid or its equivalent and the polymerization being carried out in a hydrocarbon diluent with a free radical catalyst, for example, benzoyl peroxide. The carboxyl vinyl polymers employed in this invention are more specifically described in U.S. Pat. No. 2,909,462, of particular interest being the preparation produced in acid form. A particularly effective embodiment of the high molecular weight carboxyl vinyl polymer is a water-soluble polymer of acrylic acid crosslinked with 1% of a polyallyl ether of sucrose having an average of about 5.8 allyl groups for each molecule of sucrose (Carbopol 934, formerly known as "Good-rite K-934").

Triethanolamine is added to stabilize and aid in cleaning by the emulsion. The dyes are optionally included when a colored polish is desired and are selected from the commonly used oil soluble shoe dyes such as D & C Brown 1, Sudan Dark Brown BG and Oil Black. Additional ingredients such as perfumes and preservatives are added when their well-known effects are desired.

Of particular interest in this invention are wax emulsion shoe polish compositions of the present invention having the formula:

| | |
|---|---|
| Wax | from about 2.0% to about 7.0% |
| Silicones | from about 0.1% to about 0.7% |
| Emulsifier | from about 0.7% to about 1.5% |
| Morpholine | from about 0.95% to about 2.0% |
| Viscosity Regulator | from about 0.2% to about 0.6% |
| Triethanolamine | from about 0.2% to about 0.6% |
| Dye | from about 0.0% to about 5.0% |
| Stabilizer | from about 0.4% to about 0.8% |
| Water | from about 20.0% to about 95.0% |

The stabilized polish compositions are prepared by any of the methods well known to those skilled in the art. One method of particular utility is to form an emulsion of the wax, dye, stabilizer, emulsifying agent and a portion of the water which is then added to the thickened balance of the water after which the remaining ingredients are added. Other methods known in the art would be useful.

The following examples are exemplary of the present invention.

EXAMPLE I

A primary of emulsion is prepared of the following:

| Ingredient | Grams |
|---|---|
| Petrolite C-36 (Wax) | 5.54 |
| No. 3 Carnauba Wax (Light Wax) | 0.49 |
| Silicone Fluid (350 centistokes) | 0.17 |
| Oleic Acid | 0.97 |
| Oil Brown Dye | 0.12 |
| Morpholine | 1.31 |
| Water | 23.40 |
| Igepal CO 630 | 0.60 |
| Total | 32.60 |

The primary emulsion is prepared by melting the Petrolite C-36 and Carnauba wax at 225°–235°F. and adding the Silicone with stirring followed by cooling to 215° to 225°F. There are then added in turn the oleic acid, the Ingepal CO 630, the morpholine and the dye, all with stirring. Mixing is continued for ten minutes at 210°–225°F., followed by adding this wax mixture to water heated to 210°–212°F. slowly with stirring. The emulsion thus formed is cooled rapidly to 115°F. and then let cool gradually to ambient room temperature. A 0.65% aqueous solution of Carbopol 934 is prepared by heating a measured amount of water to 100°–110°F. and sifting slowly in the required amount of Carbopol 934 with high shear mixing. Mixing is continued until the Carbopol 934 is completely dispersed (about 30 minutes) and the solution is allowed to stand until all the entrapped air escapes (1 to 4 hours). To the original emulsion is then added 64.64 gms of the Carbopol 934 solution with slow stirring so as not to entrap air bubbles. With stirring continuing there is added succesively triethanolamine (0.36 Gm), a mixture of PMA-30 (0.04 Gm) and water (2.00 Gm), and lilac perfume (0.36 Gm). Mixing is continued for thirty minutes to provide a product having the formula:

| Ingredient | Grams |
|---|---|
| Primary Emulsion | 32.60 |
| Carbopol 934 (0.65% Aqueous Solution) | 64.64 |
| Triethanolamine | 0.36 |
| Water | 2.00 |
| PMA-30 (Phenyl Mercuric Acetate) | 0.04 |
| Perfume Lilac | 0.36 |
| Total | 100.00 |

EXAMPLE II

A formulation was prepared as in Example I omitting the Igepal CO 630 having the following formula:

PRIMARY EMULSION

| Ingredient | Grams |
|---|---|
| Petrolite C-36 | 5.54 |
| No. 3 Carnauba Wax | 0.49 |
| Silicone Oil (350 centistokes) | 0.16 |
| Oleic Acid | 0.98 |
| Oil Brown Dye | 0.12 |
| Morpholine | 1.30 |

PRIMARY EMULSION-continued

| Ingredient | Grams |
| --- | --- |
| Water | 24.01 |
| Total | 32.60 |

FINAL PRODUCT

| Ingredient | Grams |
| --- | --- |
| Primary Emulsion | 32.60 |
| Carbopol 934 (0.65% aqueous solution) | 64.64 |
| Triethanolamine | 0.36 |
| Water | 2.00 |
| PMA-30 | 0.04 |
| Perfume Lilac 3965 | 0.36 |
| Total | 100.00 |

Portions of the product of Example I and of the product above were placed in one quart bottles and in two ounce bottles equipped with functional applicators. Viscosity was determined by means of a Brookfield Viscometer initially and after thirty days. The results are set forth in Table I.

TABLE 1

| | Viscosity Initial | (cps) 30 days |
| --- | --- | --- |
| Composition of Example I | 1353 | 1188 |
| Composition of Example II | 1287 | 6806 |

At the end of this time, expressing artificial ageing, the stabilized formula, of Example I, dispensed satisfactorily through the applicator and produced an excellent shine upon being buffed. The unstabilized product was very viscous and could not be dispensed satisfactorily through the applicator.

What is claimed is:

1. The method of stabilizing the viscosity of multicomponent wax emulsion shoe polish compositions by incorporating from about 0.1% to about 1.0% by weight, of a stabilizer selected from the group consisting of compounds having the formula:

$$R-X-O-(C_2H_4O)_n-H$$

wherein R is an aliphatic group containing from about 9 to about 18 carbon atoms and X is selected from the group consisting of phenylene, carbonyl and a carbon to oxygen bond and n is a whole number from about 14 to about 50 in an emulsion shoe polish composition consisting essentially of (a) from about 1.0 to 10.0% by weight of a wax; (b) up to about 1.0% by weight of a dimethyl polysiloxane having a viscosity in the range of about 200 to about 500 centistokes at 35°C.; (c) from about 0.5% to about 2.0% by weight of an emulsifier selected from the class consisting of an alkali metal salt of a fatty acid having $C_{10}$ to $C_{22}$ carbons and an amine salt of a fatty acid having $C_{10}$ to $C_{22}$ carbons; (d) from about 0.5 to about 3% by weight of morpholine; (e) from about 0.1 to about 1% by weight of a carboxy vinyl polymer; (f) from about 0.1 to about 1.0% by weight of triethanolamine; (g) up to about 5.0% of a dye; and (h) from about 20.0 to 95.0% by weight of water.

2. The method according to claim 1 wherein said viscosity regulator is the condensation product of nonylphenol and about nine moles of ethyleneoxide; said wax is present in an amount between 2.0% to about 7.0% by weight; said dimethyl polysiloxane is present in an amount between 0.1 to about 0.7% by weight; said emulsifier is present in an amount between about 0.7 and 1.5% by weight; said carboxy vinyl polymer is present in an amount between about 0.2 to about 0.6% by weight; said triethanolamine is present in an amount between 0.2 and about 0.6% by weight; and said morpholine is present in an amount between about 0.95 and about 2% by weight.

3. A method according to claim 1 wherein the carboxy vinyl polymer is a water-soluble polymer of acrylic acid crosslinked with 1% of a polyallyl ether of sucrose having an average of about 5.8 allyl groups for each molecule of sucrose.

4. The method of claim 1 wherein said stabilizer is present in the amount ranging from about 0.4% to about 0.8% by weight.

5. The method of claim 1 wherein said stabilizer is present in the amount of about 0.6% by weight.

6. A multicomponent wax emulsion shoe polish composition consisting essentially of (a) about 0.1% to about 1.0% by weight of a viscosity stabilizer of the formula:

$$R-X-O-(C_2H_4O)_n-H$$

wherein R is an aliphatic radical containing from 9 to 18 carbon atoms; X is selected from the group consisting of phenylene, carbonyl and a carbon to oxygen bond; and n is a whole number from about 12 to 50; (b) from about 1.0 to 10.0% by weight of a wax; (c) up to about 1.0% by weight of a dimethyl polysiloxane having a viscosity in the range of about 200 to about 500 centistokes at 35°C.; (d) from about 0.5% to about 2.0% by weight of an emulsifier selected from the class consisting of a alkali metal salt of a fatty acid having $C_{10}$ to $C_{22}$ carbons and an amine salt of a fatty acid having $C_{10}$ to $C_{22}$ carbons; (e) from about 0.5 to about 3% by weight of morpholine; (f) from about 0.1 to about 1% by weight of a carboxy vinyl polymer; (g) from about 0.1 to about 1.0% by weight of triethanolamine; (h) up to about 5.0% of a dye; and (i) from about 20.0 to 95.0% by weight of water.

7. The composition according to claim 6 wherein said viscosity regulator is the condensation product of nonylphenol and about nine moles of ethyleneoxide; said wax is present in an amount between 2.0% to about 7.0% by weight; said dimethyl polysiloxane is present in an amount between 0.1 to about 0.7% by weight; said emulsifier is present in an amount between about 0.7 and 1.5% by weight; said carboxy vinyl polymer is present in an amount between about 0.2 to about 0.6% by weight; said triethanolamine is present in an amount between 0.2 and about 0.6% by weight; and said morpholine is present in an amount between about 0.95 and about 2% by weight.

* * * * *